US 7,042,175 B2

(12) United States Patent
Watanabe

(10) Patent No.: US 7,042,175 B2
(45) Date of Patent: May 9, 2006

(54) APPARATUS AND METHOD FOR CONTROLLING DRIVE OF PLURAL ACTUATORS

(75) Inventor: Kazunori Watanabe, Kariya (JP)

(73) Assignee: DENSO Wave Incorporated, Tokyo (JP)

( * ) Notice: Subject to any disclaimer, the term of this patent is extended or adjusted under 35 U.S.C. 154(b) by 0 days.

(21) Appl. No.: 10/960,421

(22) Filed: Oct. 7, 2004

(65) Prior Publication Data

US 2005/0077847 A1   Apr. 14, 2005

(30) Foreign Application Priority Data

Oct. 8, 2003   (JP)   ............... 2003-349426

(51) Int. Cl.
*H02P 1/54* (2006.01)
(52) U.S. Cl. .................. 318/34; 318/569; 318/567; 318/801
(58) Field of Classification Search ............... 318/34, 318/567, 569, 98, 801; 454/69
See application file for complete search history.

(56) References Cited

U.S. PATENT DOCUMENTS 6,175,390 B1 * 1/2001 Kim et al. ............... 348/725

* cited by examiner

*Primary Examiner*—Karen Masih
(74) *Attorney, Agent, or Firm*—Harness, Dickey & Pierce, PLC

(57) ABSTRACT

An apparatus for controlling drive of a plurality of actuators is provided. The apparatus comprises a plurality of drive circuits respectively driving the actuators and respectively mounted on a plurality of circuit boards each formed as a module for driving each of the actuators. Each module is detachable to the apparatus. The apparatus comprises a plurality of capacitors each mounted on each of the circuit boards. The capacitors have capacitances different from each other. The apparatus also comprises a charging unit charging the capacitors, a measuring unit measuring a period of time during which a charging potential at each of the capacitors rises up to a predetermined potential, a module type determining unit determining a type of each of the modules in accordance with the period of time for each capacitor measured, and a unit for taking countermeasures depending on a determined result.

12 Claims, 7 Drawing Sheets

| TYPE OF CAPACITOR | CAPACITANCE | COUNT (SAMPLED AT 40 MHz) | |
|---|---|---|---|
| | | min | max |
| NO CAPACITOR | 20 | 0 | 5 |
| SS | 120 | 6 | 27 |
| S | 680 | 33 | 155 |
| M | 3300 | 159 | 754 |
| L | 33000 | 1511 | 7900 |
| LL | 220000 | 10073 | 52666 |
| LLL | 2200000 | 100731 | 526656 |

FIG. 6

100
APPARATUS AND METHOD FOR CONTROLLING DRIVE OF PLURAL ACTUATORS

CROSS REFERENCES TO RELATED APPLICATIONS

The present application relates to and incorporates by reference Japanese Patent application No. 2003-349426 filed on Oct. 8, 2003.

BACKGROUND OF THE INVENTION

1. Field of the Invention

The present invention relates to a drive controller including a plurality of drive modules for driving a plurality of actuators, and a method for determining the drive module in the drive controller.

2. Description of the Related Art

One of control systems that use a plurality of actuators is known as an industrial robot. Such a robot is for example equipped with a robot main body working as a polyarticular type of robot member, a controller controlling the robot main body, and a teaching pendant that can be used to provide necessary commands to the controller.

In this conventional configuration, the robot main body usually has one or more manipulators each using a plurality of joints, at each of which a drive motor is disposed. The drive motors are driven respectively by drive signals from drive circuits (drivers) disposed in the controller. It is frequent that each of the driver circuits, which is for example an inverter circuit, is formed as an independent module. The reason that the drive circuits are required in the form of modules is as follows.

In manufacturing the robot system, the configurations of the robot main body and the controller are not always in one-to-one correspondence. It is often that each of the robot main body and the controller is manufactured as a separate product for use in an appropriate combination of the main body and controller. Various ratings of drive motors (such as 750 W, 400 W, 200 W, 100 W, and 50 W) are used to drive each joint of the robot main body. Each inverter circuit incorporated in the controller thus needs to have current capacitance corresponding to the rating of each drive motor.

Since there are the above-described requirements, the inverter circuits are typically configured as modules detachable to the unit frame of the controller. Any appropriate inverter circuit is selected for use according to the specification of the robot main body that is to be controlled by the controller.

For the conventional controller, however, mainly the operators check visually if the type of the inverter circuit to be incorporated in the controller corresponds appropriately to the rating of the drive motor on the robot main body. A problem thus arises in that the robot main body may start its operation if the check is neglected, even if the inverter circuit corresponds in ratings to the drive motor in an appropriate manner (that is, the inverter circuit is not matched to the drive motor). If the robot main body continues to operate regardless of the inappropriate correspondence (mismatched state) between the inverter circuit and the drive motor, the inverter circuit may be overloaded.

SUMMARY OF THE INVENTION

In view of the above problems in the conventional art, the present invention has been made and has an object to provide an apparatus and method for controlling the drive of a plurality of actuators, in which the actuators are driven by drive circuits whose circuits are formed as modules, respectively, which can be mounted in the apparatus without fail, thus avoiding unwanted troubles which may occur in a mismatched state between the drive circuits (modules) and the actuators.

According to one aspect of the present invention, there is provided an apparatus for controlling drive of a plurality of actuators, comprising: a plurality of drive circuits respectively driving the actuators and respectively mounted on a plurality of circuit boards each formed as a module for driving each of the actuators, each module being detachable to the apparatus; a plurality of capacitors each mounted on each of the circuit boards, the capacitors having capacitance values different from each other; a charging unit charging the capacitors; a measuring unit measuring a period of time during which a charging potential at each of the capacitors rises up to a predetermined potential; a module type determining unit determining a type of each of the modules in accordance with the period of time for each capacitor measured by the measuring unit; and a unit for taking countermeasures depending on a result determined by the module type determining unit.

For example, the type of the drive module may be determined by providing a dip switch or the like on the circuit board, selecting ON or OFF setting with respect to the type of the drive module, and reading out the selected condition. Such a method, however, needs more data bits to determine more types of the drive modules. For example, determining five or more types of the drive modules needs three bits for each module, and extra signal lines need to be provided, accordingly.

In contrast, the present invention uses capacitors with different capacitances, which have different times for their charged potential to reach a predetermined potential depending on their capacitance. The measurement of the time can thus determine the types of the drive modules. Because the potential can be observed by selecting sequentially each single signal line provided on each drive module, more types of the drive module do not need more signal lines for each drive module.

Preferably, the control circuit uses a logic circuit element to determine whether or not the charged potential of the determination capacitor reaches the predetermined potential. Specifically, if the charged potential is given as the input signal to the logic circuit element, the logic circuit element can have a changed output signal level when the charged potential exceeds the threshold level, and the control circuits can thus determine very easily that the charged potential reaches the predetermined potential.

Still preferably, the control circuit determines whether or not the drive module for each actuator corresponds to the rating of each actuator, and if there is any mismatched combination, the control circuit stops the control of the actuator. The drive circuit can thus be prevented from being overloaded.

It is also preferred that if there is the above-described any mismatched combination, the control circuit performs notification to a user by a notification means, so that the user can rapidly take action to restart the drive control, such as by exchanging the drive module.

Preferably, the plurality of actuators drive joints of an articulated robot. Specifically, the multi-articulated robot includes a plurality of actuators corresponding to each joint (i.e., drive shaft), so that the drive controller according to the present invention can be applied to the controller of the robot to determine rapidly whether or not the drive module in the drive controller in question is appropriate to drive each part of the articulated robot.

As another aspect, the present invention provides the methods for controlling the drive of a plurality of actuators, which is also advantageous over the prior art as described above.

BRIEF DESCRIPTION OF THE DRAWINGS

Other objects and aspects of the present invention will become apparent from the following description and embodiments with reference to the accompanying drawings in which:

FIG. 5 shows a flowchart illustrative of the processing performed by a CPU and the FPGA in the controller when the controller is powered on;

FIG. 6 is a table exemplifying the relation between capacitances given to determination capacitors and count values used by the counter.

DETAILED DESCRIPTION OF THE PREFERRED EMBODIMENT

Referring to FIGS. 1–7, an apparatus and method for controlling the dive of plural actuators, which is according to an embodiment of the present invention, will now be described.

In the present embodiment the control apparatus and method are reduced into practice in an industrial robot system, but is not always limited to such a robot system. Any system is able to use this control apparatus and method, as long as a plurality of actuators is individually driven by drive circuits formed as detachable modules.

Figure 1:
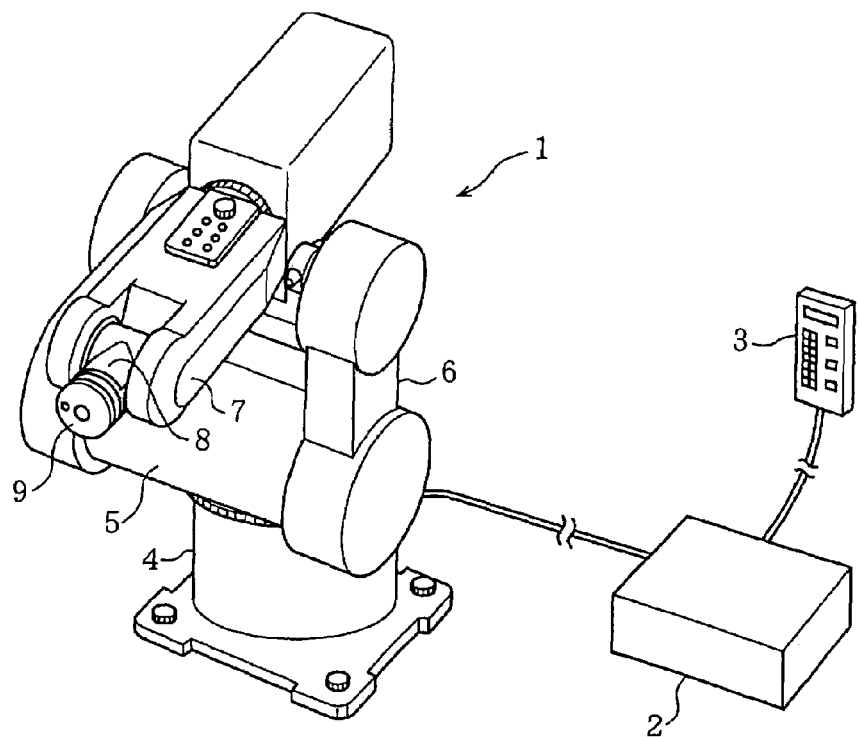
FIG. 1 is a perspective view showing the configuration of an industrial robot system according to an embodiment of the present invention.
Figure 2:
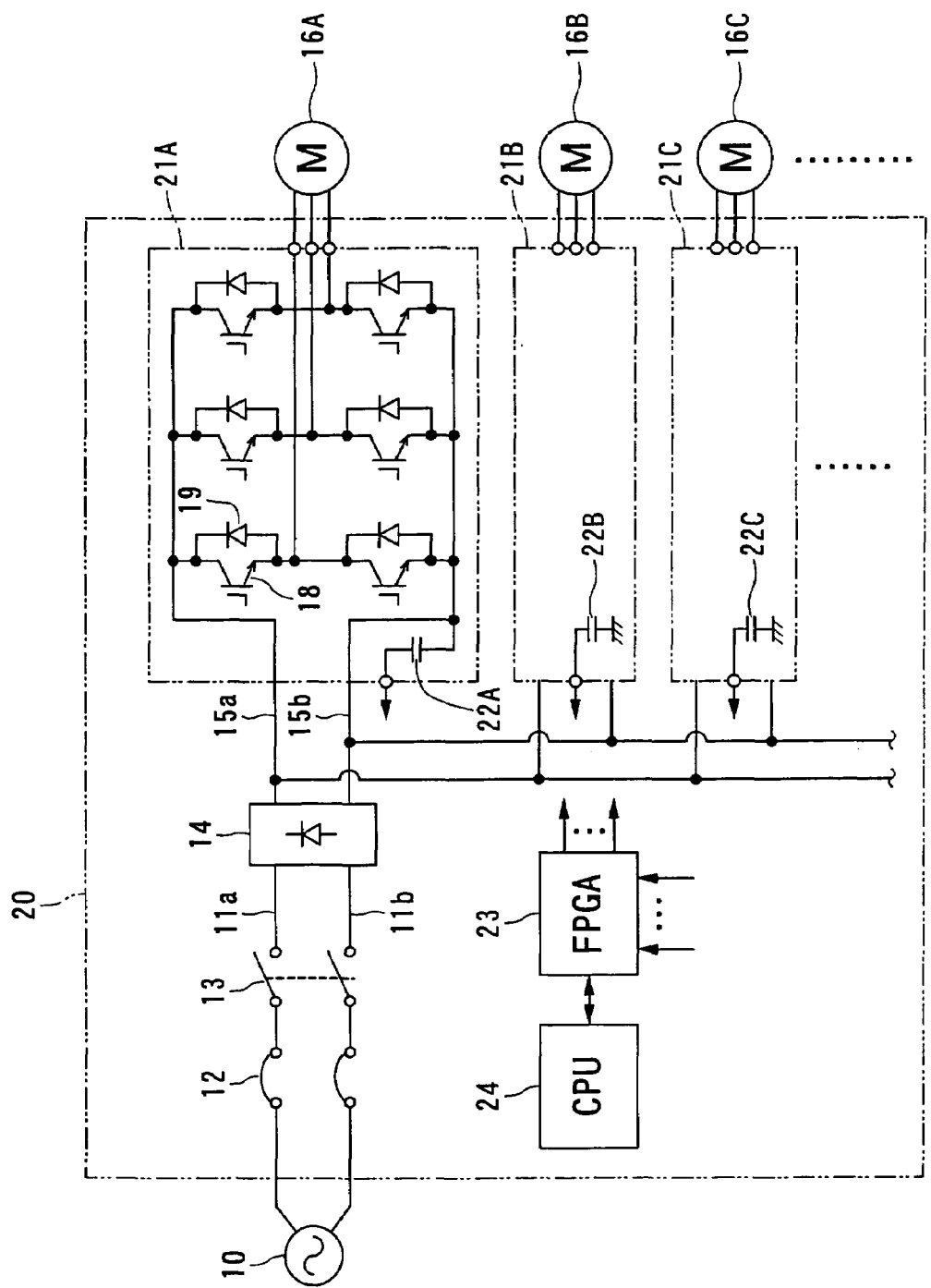
FIG. 2 is a circuit diagram showing the configuration of a controller for controlling a polyarticular type of robot of the robot system, the circuit diagram showing an electrical circuit with a central focus on the controller.

FIG. 1 shows the configuration of an industrial robot system that adopts the control apparatus and method according to the present invention. The system includes a robot main body 1, a controller 20 for controlling the robot main body 1, and a teaching pendant connected to the controller 20.

The robot main body 1 is configured as an articulated robot, which includes a base 4, a shoulder 5 that is horizontally and rotatably supported on the base, a lower arm 6 that is vertically and rotatably supported on the shoulder 5, an upper arm 7 that is vertically and rotatably supported on the lower arm 6, and a wrist 8 that is vertically and rotatably supported on the upper arm 7. The wrist 8 includes a rotatable (twistable) flange 9 at its end. Although not shown, hands or gripping works can be attached to the flange 9.

FIG. 1 schematically shows a drive system for the robot. For example, a circuit breaker 12 and a power supply switch 13 are connected in series between a commercial single-phase alternating current source (200 V) 10 and each of main power supply lines 11a and 11b. The power supply switch 13 may include a semiconductor switching element such as a triac, or a mechanical switch such as a relay switch.

Connected to the main power supply lines 11a and 11b is a rectifier module 14, which includes a full wave rectifier circuit and a smoothing capacitor (both not shown). This rectification module 14 has a couple of output terminals, which connects to direct current bus bars 15a and 15b on the plus and minus sides, respectively. The bus bars 15a and 15b connect to a plurality of inverter circuits (i.e., drive circuits) 21 (A, B, C, . . . ) for driving a plurality of drive motors (i.e., actuators) 16 (A, B, C, . . . ), each of which is disposed on each joint of the robot main body 1. The inverter circuits 21 reside in a main circuit of the controller 20.

Each inverter circuit 17 is a known circuit that includes six switching elements 18 (such as IGBTs) connected in a three-phase bridge and includes a flywheel diode 19 connected in parallel with each switching element 18. The controller 20 sends a PWM (i.e., Pulse Width Modulation) signal that turns on and off each switching element 18.

Although not specifically shown, to detect displacement positions of the shoulder 5, each arm 6, 7, wrist 8, and flange 9, the corresponding drive motors 16 each incorporate a rotary encoder. The controller 20 can detect the displacement positions of the shoulder 5, each arm 6, 7, wrist 8, and flange 9 based on the detection signals from the rotary encoder to feedback control the components during their operation according to an operation program.

Moreover the controller 20 is provided with some components inherent to the present embodiment of the present invention.

Specifically, the inverter circuit 21 (A, B, C, . . . ) resides on a circuit board that bears a capacitor 22 (A, B, C, . . . ) with different capacitance. Each determination capacitor 22 has one end connected to the circuit ground, and the other end connected to the input port of FPGA (i.e., Field Programmable Gate Array) 23. The inverter circuit 21 (A, B, C, . . . ) is configured as a drive module mechanically detachable to the casing of a controller unit in which the controller 20 is mounted. When being mounted in the casing, the inverter circuit 21 is electrically connected to the remaining electrical circuit, thus forming the electrical configuration shown in FIG. 2.

Figure 3:
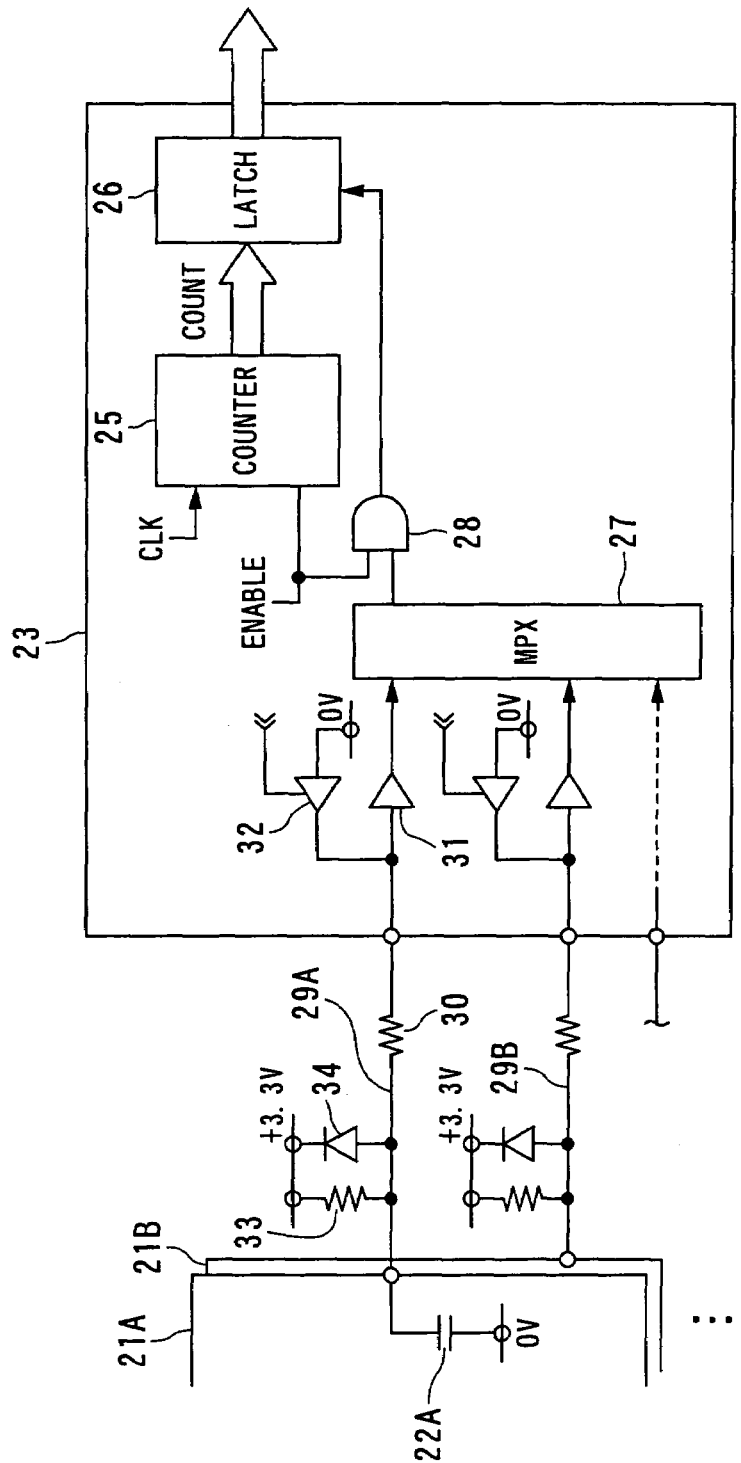
FIG. 3 shows the internal configuration of an FPGA embedded in the drive controller, particularly a part of the FPGA that is relevant to the scope of the present invention.

The controller 20 is able to control drive motors 16 using mainly CPU (i.e., control circuit) 24 and FPGA (i.e., control circuit) 23. FIG. 3 shows the internal configuration of components in the FPGA, particularly the portion thereof that is relevant to the concept of the present invention. The FPGA 23 includes components such as a counter 25, a data latch 26, a multiplexer (MPX) 27, and an AND gate (i.e., logic circuit element) 28. The multiplexer 27 has each input terminal that connects via an input resistor 30 and an input buffer 31 to a signal line 29 (A, B, C, . . . ) that connects to the other end of the determination capacitor 22 in each inverter circuit 21.

The input buffer 31 has an input that connects to the output terminal of the output buffer 32. The output buffer 32 has a tri-state output and has an input terminal connected to the ground of the circuit (i.e., data "0"). The signal line 29 connects via a pull-up resistor 33 to a 3.3 V control power supply. The pull-up resistor 33 has a diode 34 connected in parallel across it. The multiplexer 27 has an output terminal that connects to one of the input terminals of the AND gate 28. The AND gate 28 has the other input terminal that receives an enable signal (i.e., high active) for the counter 25. The AND gate 28 sends an output signal that is provided to the data latch 26 as a latch signal.

Figure 4:
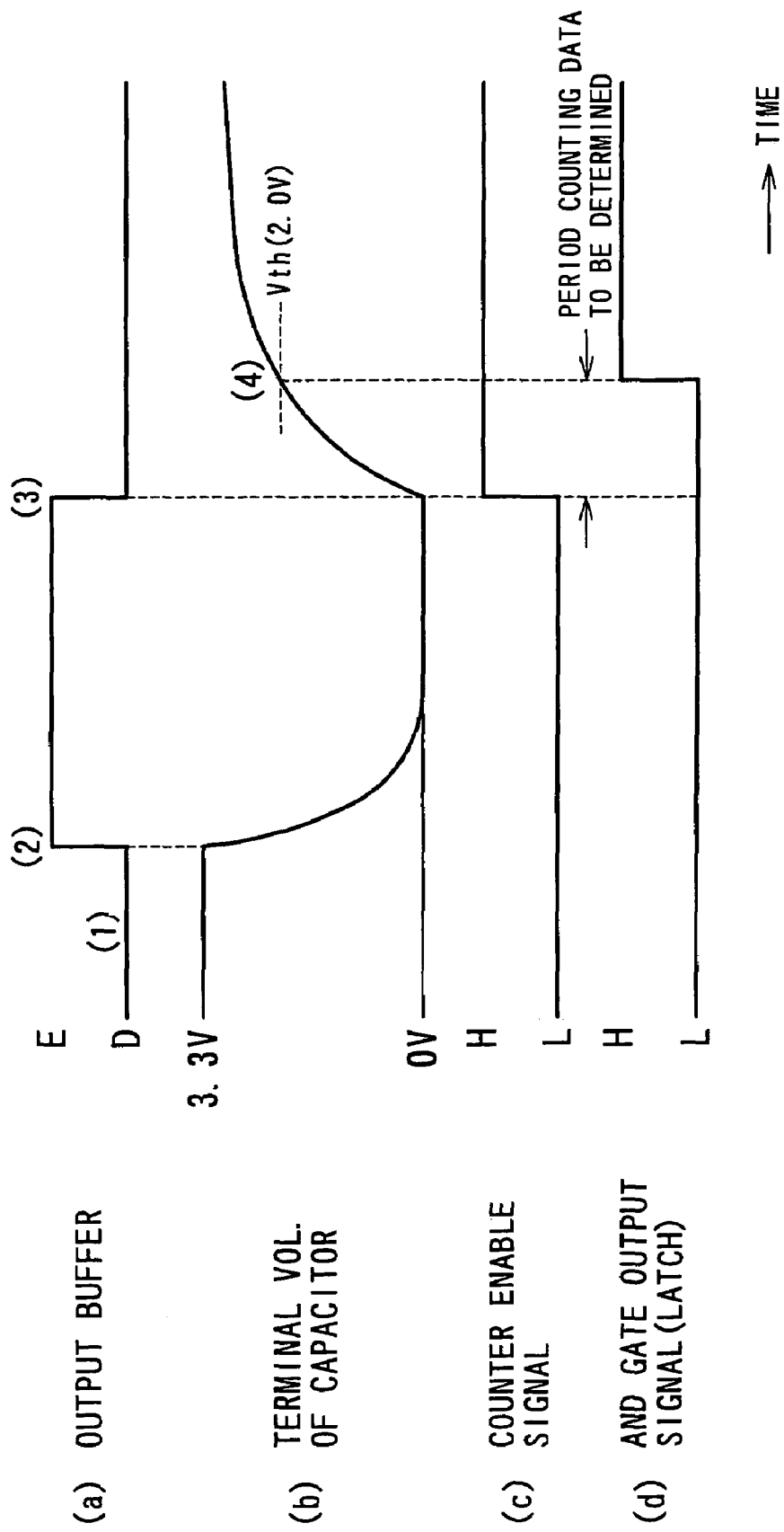
FIG. 4 shows a timing chart illustrative of a signal waveform at each component during the performance of a determination process.
Figure 5:
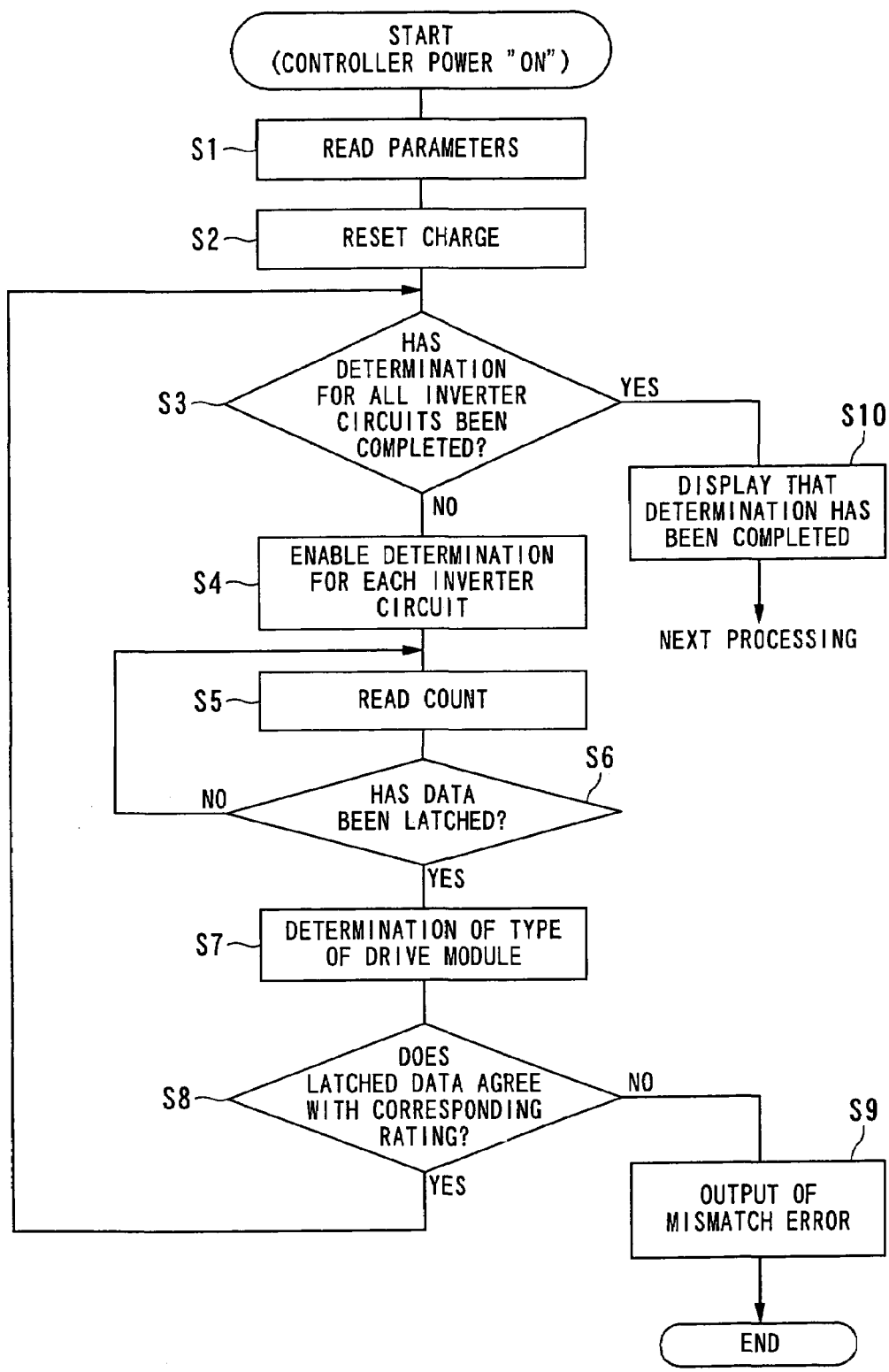

Referring to FIGS. 4 to 6, the operation and advantages this embodiment will be described below.

FIG. 5 shows a flowchart illustrative of the processing of a test conducted by both of the CPU 24 and FPGA 23 in a cooperative manner, when the controller 20 is powered on. The test is conducted to exclude erroneous connection (attachment) of the inverter circuits (i.e., drive modules) 21 to the controller 20. FIG. 4 shows a timing chart illustrative of the signal waveform at each component during the test of the inverter circuits 21. The test includes processing for determination of types of drive modules.

First, the CPU 24 reads in various control parameters stored in, although not-shown, a non-volatile memory (step S1). The parameters include the specification data of the robot main body 1 inputted using the teaching pendant 3.

The CPU 24 then outputs a control signal to FPGA 23 to reset the charge (i.e., discharge) of the determination capacitor 22 (step S2). Specifically, if the output buffer 32 is disabled, then the determination capacitor 22 is charged up to 3.3 V through the pull-up resistor 33 (see FIGS. 4, (a) and (b), time point (1)). If the output buffer 32 is enabled, the signal line 29 is driven to the ground level to discharge the charge of the determination capacitor 22 (see FIGS. 4, (a) and (b), time point (2)).

The CPU 24 then determines whether or not determining the types of all the inverter circuits 21 (i.e., for all the drive shafts of the robot main body 21) has been completed (step S3). If not ("NO"), the CPU disables the output buffer connected to the signal line 29 of the drive module that is to be determined at that time, and at the same time activates the enable signal for the counter 25 (step S4, see FIGS. 4, (a) and (c), time point (3)).

The determination capacitor 22 then starts being charged to increase its terminal voltage (see FIG. 4, (b)). The counter starts to count at the same time (step S5) with the start of the charging. When the charged potential of the determination capacitor 22 reaches 2.0 V (predetermined potential) of the threshold level (Vth) of AND gate 28, the output terminal of AND gate 28 changes to a high level (see FIG. 4, (d), time point (4)). The data latch 26 thus latches the count data of the counter 25 at the time point (4) shown in FIG. 4 (step S6, "YES"). The CPU 24 then reads in the output data from the data latch 26 in FPGA 23, and determines whether or not the read data corresponds to the rating of the drive motor 16 of the robot main body 1 that is to be driven by the drive module (step S7).

FIG. 6 shows an example of the capacitance setting of the determination capacitor 22 vs. the count of the counter 25. The determination capacitor 22 can set six levels of capacitance from "SS" of 120 pF to "LLL" of 2200 μF. These correspond to the types of drive modules, which vary with the magnitude of the rating of the drive motor 16. Even if the determination capacitor 22 is not mounted, FPGA 23 can have the input capacitance (stray capacitance and others) of about 20 pF, so that "not mounted" can be used as one setting level.

The control power supply voltage of 3.3 V is a standard value. The actual voltage values may vary over a range of about 0.3 V between the minimum and maximum voltages. For the determination capacitor 22, the actual products generally have capacitance with ±5% or ±10% or the like, and these accuracy conditions (i.e., variations) may thus vary the charging time to the predetermined potential and the count. The charging time may generally vary from a few tens of nanoseconds to ten-odd seconds for the entire range from the minimum to maximum capacitance setting of the determination capacitor 22.

The counter 25 with 16 bits counts up at 40 MHz clock. The count is then "0" to "5" for "not mounted," "6" to "27" for "SS," "33" to "155" for "S," and "159" to "754" for "M" or the like. The CPU 24 can thus determine the drive module inverter circuit) type according to any count range to which the count of the counter 25 belongs.

Referring again to FIG. 5, at step S7, the CPU 24 determines the type of an inverter circuit 21 in question, as described above, based on the count read from the data latch 26 (step S7), and then determines whether or not the determined inverter-circuit type corresponds to the rating of the drive motor 16 of the robot main body 1 that is to be driven by the drive module in question (step S8). If so (i.e., "YES"), the processing is returned to step S3, where the multiplexer 27 selects another signal line 29 and a determination is made on the next drive module.

If there is any mismatched combination of the drive module type and drive motor rating at step 7 (i.e., "NO"), CPU 24 performs notification to the user by a notification means such as by sounding, although not-shown, a buzzer provided on the main body of the controller 20 or by activating a warning lamp (a mismatch error output, step S9). The process is then stopped as it is. Specifically, the controller 20 stops the control of the robot main-body 1 at that time.

Meanwhile the determination at step S3 is YES, that is, the determination for all the inverter circuits 21 has been completed, the CPU 24 performs, on a not shown display, that the determination has been completed, before shifting it processing to other types of necessary processing.

In the present embodiment, both the CPU and the FPGA cooperatively operate to realize the essential part of the charging unit, measuring unit, module type determining unit, countermeasure taking unit, and informing unit of the present invention.

Figure 7:
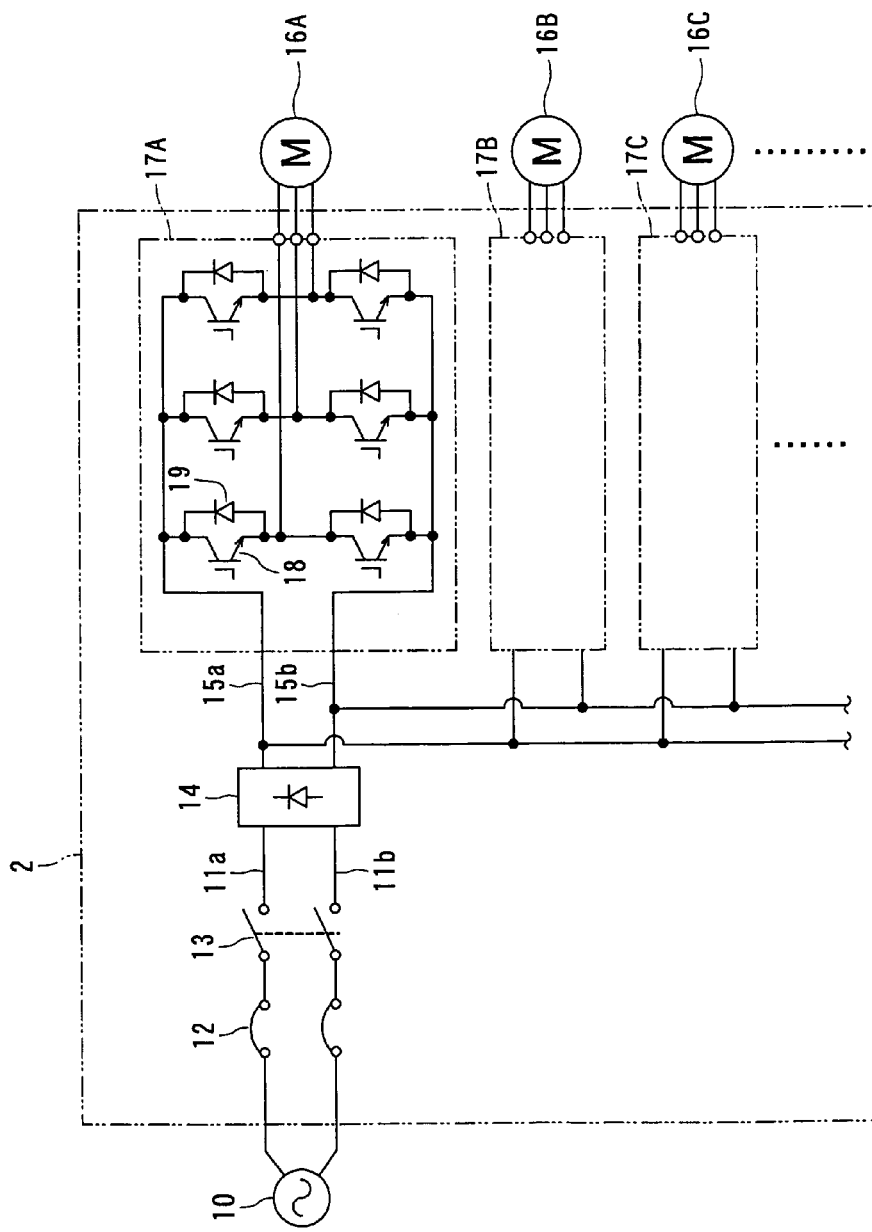
FIG. 7 is a circuit diagram showing the configuration of a conventional controller for controlling a polyarticular type of robot, the circuit diagram being adopted to show a difference from the configuration of the circuit diagram shown in FIG. 2.

FIG. 7 shows the configuration of a controller used by a conventional robot system, for a comparison with the controller according to the present embodiment. As shown in FIG. 7, a controller 2 is provided instead of the foregoing controller 20. The controller 2 is identical in configuration and operation to that described in the foregoing embodiment, except that the capacitors 22 (A, B, . . . ), FPGA 23, and CPU 24 adopted by the present embodiment (in FIG. 2) are eliminated to provide inverter circuits 17 (A, B, . . . ) with no capacitors. Hence, the arrangement of the capacitors 22 (A, B, . . . ), FPGA 23, and CPU 24 is a distinctive feature for the present invention and making it possible that the drive circuits (drive modules) can be disposed into the controller and connected to the motors without fail when the robot system is installed after being manufactured.

As described above, this embodiment disposes a determination capacitor 22 with different capacitance on each circuit board bearing each of a plurality of inverter circuits 21, and allows CPU 24 of the controller 20 to charge each determination capacitor 22 through FPGA 23 and to measure the time for the charged potential to reach a predetermined potential, in order to determine the types of a plurality of drive modules, i.e., the inverter circuits 21. The capacitance difference between the determination capacitors 22 can thus help to determine the type of each drive module. The charged potential of the determination capacitor 22 can be observed by selecting sequentially each signal line 29 provided on each drive module. This embodiment thus does not need more signal lines 29 on each drive module for more types of the drive module.

Because the FPGA 23 uses the AND gate 28 to determine whether or not the charged potential of the determination capacitor 22 reaches a predetermined potential, it can be determined very easily whether or not the charged potential reaches a predetermined potential. Because AND gate 28 is a TTL (i.e., Transistor-Transistor Logic), the FPGA 23 can determine the potential more rapidly than with a CMOS logic.

The CPU 24 determines whether or not the drive module for each drive motor 16 corresponds to the rating of each drive motor 16, and if there is any mismatched combination, CPU 24 stops the control of the drive motor 16, so that the inverter circuit 21 can be prevented from being overloaded. In addition, if there is any mismatched combination, CPU 24 performs notification to the user by a notification means, so that the user can rapidly take action to restart the drive control, such as by exchanging the drive module.

Because the present invention is applied to the drive controller 20 for controlling the articulated robot main body 1, it is possible to rapidly determine whether or not the drive module appropriately matches the robot main body 1 having the number of drive motors 16 for driving each joint.

The present invention is not limited to the embodiments described herein and shown in the drawings, and various other changes and extension may be made as follows.

The notification by the notification means may be performed if necessary.

Instead of stopping the drive motor 16 when the matching is inappropriate, CPU 24 may, if the controller 20 contains extra drive modules, automatically select connection to a drive module that appropriately matches the drive motor 16 and then start to drive the drive motor 16.

The present invention is not limited to FPGA 23, but any other devices such as agate array and a discrete device may be used to form the same circuit.

For the circuit that determines the charged potential, AND gate 28 may be replaced by a CMOS logic AND gate or a comparator.

The switching element included in the inverter circuit 21 is not limited to IGBT, but may be a power transistor or a power MOSFET.

The actuator is not limited to the drive motor 16, but may be in any form that can displace the driven object according to the electrical signal.

Of course, the commercial alternator may be in three phases and the voltage may be 100 V.

The present invention is not limited to the application to the robot controller, but may be applied to any drive controller that includes a plurality of drive circuits for driving a plurality of actuators.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. An apparatus for controlling drive of a plurality of actuators, comprising:
   a plurality of drive circuits respectively driving the actuators and respectively mounted on a plurality of circuit boards each formed as a module for driving each of the actuators, each module being detachable to the apparatus;
   a module type determining unit determining a type of each of the modules; and
   a unit for taking countermeasures depending on a result determined by the module type determining unit.

2. An apparatus for controlling drive of a plurality of actuators, comprising:
   a plurality of drive circuits respectively driving the actuators and respectively mounted on a plurality of circuit boards each formed as a module for driving each of the actuators, each module being detachable to the apparatus;
   a plurality of capacitors each mounted on each of the circuit boards, the capacitors having capacitance values different from each other;
   a charging unit charging the capacitors;
   a measuring unit measuring a period of time during which a charged potential of each of the capacitors rises up to a predetermined potential; and
   a module type determining unit determining a type of each of the modules in accordance with the period of time for each capacitor measured by the measuring unit.

3. An apparatus for controlling drive of a plurality of actuators, comprising:
   a plurality of drive circuits respectively driving the actuators and respectively mounted on a plurality of circuit boards each formed as a module for driving each of the actuators, each module being detachable to the apparatus;
   a plurality of capacitors each mounted on each of the circuit boards, the capacitors having capacitance values different from each other;
   a charging unit charging the capacitors;
   a measuring unit measuring a period of time during which a charging potential at each of the capacitors rises up to a predetermined potential;
   a module type determining unit determining a type of each of the modules in accordance with the period of time for each capacitor measured by the measuring unit; and
   a unit for taking countermeasures depending on a result determined by the module type determining unit.

4. The apparatus according to claim 3, wherein the module type determining unit is provided with a logic circuit element to determine whether or not the charging potential at each of the capacitors rises up to the predetermined potential.

5. The apparatus according to claim 3, wherein the module type determining unit comprise means for receiving information in relation to ratings of the plural actuators and means for determining whether or not the drive modules corresponding to the respective actuators are in accordance with each rating of each actuator, and
   wherein the countermeasure-taking unit stopping the drive and control of each actuator in cases where the determining means reveals that there is a disagreement between the actuators and the rating.

6. The apparatus according to claim 5, further comprising:
   an informing unit informs a user of the disagreement when there is a disagreement between the actuators and the rating.

7. The apparatus according to claim 5, wherein the plurality of actuators are actuating members each driving each of joints of a polyarticular type of robot.

8. A method for controlling drive of a plurality of actuators respectively driven by a plurality of drive circuits respectively mounted on a plurality of circuit boards each formed as a module for driving each of the actuators, each module being detachable to the apparatus, a plurality of capacitors each being mounted on each of the circuit boards, and the capacitors having capacitance values different from each other, comprising:

measuring a period of time during which a charging potential at each of the capacitors charged by a charging unit rises up to a predetermined potential;

determining a type of each of the modules in accordance with the period of time for each capacitor measured; and taking countermeasures depending on a result determined by the module type determining unit.

9. The method according to claim 8, wherein the determination of the type of each of the modules uses a logic circuit element to determine whether or not the charging potential at each of the capacitors rises up to the predetermined potential.

10. The method according to claim 8, wherein the determination of the type of each of the modules includes reception of information in relation to ratings of the plural actuators and determination of whether or not the drive modules corresponding to the respective actuators are in accordance with each rating of each actuator, and wherein the countermeasure includes stopping the drive and control of each actuator, in cases where there is a disagreement between the actuators and the rating.

11. The method according to claim 10, further comprising:

informing a user of the disagreement when there is the disagreement between the actuators and the rating.

12. The method according to claim 8, wherein the plurality of actuators are actuating members each driving each of joints of a polyarticular type of robot.

\* \* \* \* \*